United States Patent
Ishii et al.

(10) Patent No.: US 6,477,063 B2
(45) Date of Patent: Nov. 5, 2002

(54) MULTI-OUTPUT SWITCHING POWER SOURCE APPARATUS

(75) Inventors: Takuya Ishii, Suita (JP); Yasufumi Nakajima, Hirakata (JP); Hisanori Nagase, Hirakata (JP); Hideki Okura, Mie (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/947,717

(22) Filed: Sep. 6, 2001

(65) Prior Publication Data

US 2002/0118551 A1 Aug. 29, 2002

(30) Foreign Application Priority Data

Sep. 7, 2000 (JP) ........................................ 2000-271096

(51) Int. Cl.[7] ............................ H02M 3/335; G05F 1/10
(52) U.S. Cl. ..................................... 363/21.04; 323/222
(58) Field of Search ........................... 363/21.04, 21.14, 363/21.15, 21.12, 56, 97, 49, 26; 323/222, 906

(56) References Cited

U.S. PATENT DOCUMENTS

| | | | |
|---|---|---|---|
| 4,189,764 A | | 2/1980 | Snyder |
| 4,691,159 A | * | 9/1987 | Ahrens et al. ............... 323/222 |
| 4,841,160 A | * | 6/1989 | Yon et al. ...................... 307/66 |
| 4,958,268 A | | 9/1990 | Nagagata et al. |
| 5,671,131 A | * | 9/1997 | Brown ......................... 363/56 |

FOREIGN PATENT DOCUMENTS

JP            2803186        7/1998

* cited by examiner

*Primary Examiner*—Rajnikant B. Patel
(74) *Attorney, Agent, or Firm*—Pearne & Gordon LLP

(57) ABSTRACT

A multi-output switching power source apparatus having a plurality of outputs, wherein electric power regenerated from a load side to one of the outputs can be output as electric power supplied to other loads. The switching power source apparatus comprises a main switching circuit for turning ON/OFF the voltage of a DC power source and for inputting the voltage to the primary winding of a transformer, secondary switching circuits for rectifying AC voltages induced across the output windings, output capacitors for smoothing and outputting the voltages, and a control drive circuit for adjusting the ON/OFF periods of the switching circuits. The outputs are short-circuited during the OFF period of the main switching circuit via the transformer, whereby the fluctuations of the output voltages can be controlled.

10 Claims, 10 Drawing Sheets

US 6,477,063 B2

MULTI-OUTPUT SWITCHING POWER SOURCE APPARATUS

BACKGROUND OF THE INVENTION

The present invention relates to a multi-output switching power source apparatus for supplying stabilized DC voltages to a plurality of loads in industrial and consumer electronic appliances. As this kind of multi-output switching power source apparatus, the multi-output switching power source apparatus disclosed in Japanese Patent Publication No. 2803186 discloses is available.

FIG. 9 is a circuit diagram of the multi-output switching power source apparatus disclosed in Japanese Patent Publication No. 2803186. The reference numerals in the Japanese Patent Publication No. 2803186 are changed so as to be matched with those in the explanations of the present invention. FIG. 10 shows operation waveforms at various portions in the circuit shown in FIG. 9.

The operation of the conventional multi-output switching power source apparatus will be described below by using FIG. 9 and FIG. 10.

First, when a main switching circuit 202 is ON, an input voltage Ei is applied to the primary winding 231 of a transformer 203. At this time, a current Id flows through the primary winding 231. When the main switching circuit 202 turns OFF at time t1, a current Is1 flows from an output winding 233 via a diode 241, and a current Is2 flows from an output winding 234 via a diode 261. A switching device 260 connected in parallel with the diode 261 is turned ON by a drive pulse signal Vg6 from a control circuit 213 during a period between time t1 and time t2. The current Is2 becomes zero at time t2 but flows continuously in the opposite direction via the switching device 260. Hence, an output voltage Eo2 is applied to the output winding 234. On the other hand, when the current Is1 becomes zero, the diode 241 turns OFF, and the current Is1 stops flowing.

The control circuit 213 controls the ON period of the switching device 260. When the switching device 260 turns OFF at time t3, the voltage across each winding of the transformer 203 is reversed. At this time, a diode 221 conducts on the primary side. A drive circuit 209 detects that the voltage across a drive winding 232 has been reversed, and outputs a drive pulse signal Vg2 for turning on the switching device 220 of the main switching circuit 202. The current Id flowing through the main switching circuit 202 flows so as to regenerate electric power for a DC power source 1.

This current Id becomes zero at time t4 as shown at a part (b) of FIG. 10. After time t4, the current Id flows from the DC power source 1 to the primary winding 231 and the switching device 220. At time t5, the switching device 220 turns OFF, and the above-mentioned operation after time t1 is repeated.

When the number of turns of the primary winding 231 is N31, when the number of turns of the output winding 233 is N33, when the number of turns of the output winding 234 is N34, and when the ON period and the OFF period of the main switching circuit 202 are Ton and Toff respectively in the above-mentioned operation, output voltages Eo1 and Eo2 are represented by the following expressions (1) and (2) respectively:

$$Eo1 \approx (N33/N31) \cdot (Ton/Toff) \cdot Ei \quad (1), \text{ and}$$

$$Eo2 \approx (N34/N31) \cdot (Ton/Toff) \cdot Ei \quad (2).$$

The relationships shown in the expressions (1) and (2) are similar to the relationships between the input and output voltages of an ordinary flyback converter. In the case of the conventional multi-output switching power source apparatus shown in FIG. 9, the drive circuit 209 sets the ON period Ton, and the control circuit 213 adjusts the OFF period Toff so as to stabilize the output voltage Eo1.

Generally in a multi-output switching power source apparatus, the output voltages of unstabilized outputs, other than outputs controlled directly so as to be stabilized, fluctuate depending on input and output conditions. This kind of voltage fluctuation is caused by induced voltages due to leak inductances of a transformer and voltage drops due to line impedances. In the case of the output voltage (Eo2) not controlled so as to be stabilized for example, when its output current (Io2) increases, a voltage drop due to a line impedance increases, and the output voltage (Eo2) lowers. On the other hand, in the case of the output voltage (Eo1) controlled so as to be stabilized, when its output current (Io1) increases, the ON period (Ton) of the main switching circuit 2 becomes long, and the output voltage (Eo2) rises. The output voltage (Eo2) fluctuates up and down as described above to stabilize the output voltage (Eo1) in spite of the voltage drop due to the line impedance. In particular, when the output current (Io2) is very small, an induced voltage due to a leak inductance, which is superimposed on the winding voltage of the transformer 3, raises the output voltage (Eo2) further.

In the conventional multi-output switching power source apparatus shown in FIG. 9, however, the output current Io1 serving as a stabilized output is large; even if the output current Io2 serving as an unstabilized output is zero, the above-mentioned rise of the output voltage Eo2 does not occur. This is because the current Is2 flows during the whole range of the OFF period Toff regardless of input and output conditions, whereby a condition wherein the output current Io2 is equivalently large is maintained. Furthermore, the induced voltage due to the leak inductance, which is superimposed on the output winding 34, is controlled, and the voltage drop due to the line impedance is not affected by the output current Io2.

However, in the conventional multi-output switching power source apparatus shown in FIG. 9, when the output current Io1 is small, the voltage drop due to the line impedance is also small, and the ON period Ton becomes short. In this case, the output voltage Eo2 rises, thereby causing a problem.

To cope with the diversification of loads in industrial and consumer electronic appliances, multi-output switching power source apparatuses capable of stably supplying a plurality of output voltages in all conditions are demanded. The present invention is intended to provide a multi-output switching power source apparatus capable of controlling the fluctuations of output voltages in any load conditions excluding overloads.

BRIEF SUMMARY OF THE INVENTION

A multi-output switching power source apparatus in accordance with the present invention comprises:

a main switching circuit for converting the voltage of a DC power source into an AC voltage and for inputting the voltage to the primary winding of a transformer, the transformer having a plurality of output windings including the primary winding, a plurality of secondary switching circuits to which AC voltages induced across the plurality of output windings are input and which turn ON/OFF complementarily with the main switching circuit, a plurality of smoothing circuits connected to the plurality of secondary switching circuits respectively, and a control drive circuit for turning ON each of the secondary switching circuits after the main switching circuit is turned OFF, for turning ON the main switching circuit after each of the secondary switching circuits is turned OFF, for detecting one of a plurality of DC output voltages and for adjusting the ON period of the main switching circuit and the ON period of each of the secondary switching circuits to stabilize the DC output voltage.

In the multi-output switching power source apparatus in accordance with the present invention configured as described above, each of the secondary switching circuits turns ON during the OFF period of the main switching circuit, whereby the outputs are short-circuited via the transformer. For this reason, factors for fluctuating each output voltage can be limited to a voltage drop due to the line impedance of each output. Hence, the present invention can control the fluctuations of the output voltages in any load conditions including electric power supply from a load but excluding overloads.

A multi-output switching power source apparatus in accordance with another aspect of the present invention comprises:

a DC power source, a transformer having a primary winding and a plurality of output windings, a main switching circuit for converting the voltage of the DC power source into an AC voltage by repeating ON/OFF operation and for inputting the voltage to the primary winding of the transformer, first to nth (n: a natural number of 2 or more) secondary switching circuits connected to the first to nth output windings of the plurality of output windings respectively and turning ON/OFF complementarily with the main switching circuit in order to rectify AC voltages induced across the first to nth output windings, first to nth smoothing circuits for smoothing voltages rectified by the first to nth secondary switching circuits and for supplying first to nth DC output voltages to first to nth loads, and a control drive circuit for turning ON the first to nth secondary switching circuits after the main switching circuit is turned OFF, for turning ON the main switching circuit after the first to nth secondary switching circuits are turned OFF, for detecting one of the first to nth DC output voltages and for adjusting the ON period of the main switching circuit and the ON periods of the first to nth secondary switching circuits to stabilize the DC output voltage. The multi-output switching power source apparatus in accordance with the present invention configured as described above can control the fluctuations of the output voltages against all load conditions excluding overloads and can transfer electric power among the outputs via the transformer; when electric power is supplied from one load side, the electric power can be supplied to the other load side via the transformer.

A multi-output switching power source apparatus in accordance with still another aspect of the present invention comprises:

a DC power source, a transformer having a primary winding and at least one output winding, a main switching circuit for converting the voltage of the DC power source into an AC voltage by repeating ON/OFF operation and for inputting the voltage to the primary winding of the transformer, a first secondary switching circuit connected to the primary winding and turning ON/OFF complementarily with the main switching circuit in order to rectify an AC voltage induced across the primary winding, second to (n+1)th (n: a natural number) secondary switching circuits connected to the first to nth output windings of the output windings and turning ON/OFF complementarily with the main switching circuit in order to rectify AC voltages induced across the first to nth output windings, first to (n+1)th smoothing circuits for smoothing voltages rectified by the first to (n+1)th secondary switching circuits and for supplying first to (n+1)th DC output voltages to first to (n+1)th loads, and a control drive circuit for turning ON the first to (n+1)th secondary switching circuits after the main switching circuit is turned OFF, for turning ON the main switching circuit after the first to (n+1)th secondary switching circuits are turned OFF, for detecting one of the first to (n+1)th DC output voltages and for adjusting the ON period of the main switching circuit and the ON periods of the first to (n+1)th secondary switching circuits to stabilize the DC output voltage. The multi-output switching power source apparatus in accordance with the present invention configured as described above can control the fluctuations of the output voltages against all load conditions excluding overloads and can transfer electric power among the outputs via the transformer; when electric power is supplied from one load side, the electric power can be supplied to the other load side via the transformer.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF DRAWING

It will be recognized that some or all of the Figures are schematic representations for purposes of illustration and do not necessarily depict the actual relative sizes or locations of the elements shown.

DETAILED DESCRIPTION OF THE INVENTION

Preferable embodiments of a multi-output switching power source apparatus in accordance with the present invention will be described below referring to the accompanying drawings.

<<First Embodiment>>

Figure 1:
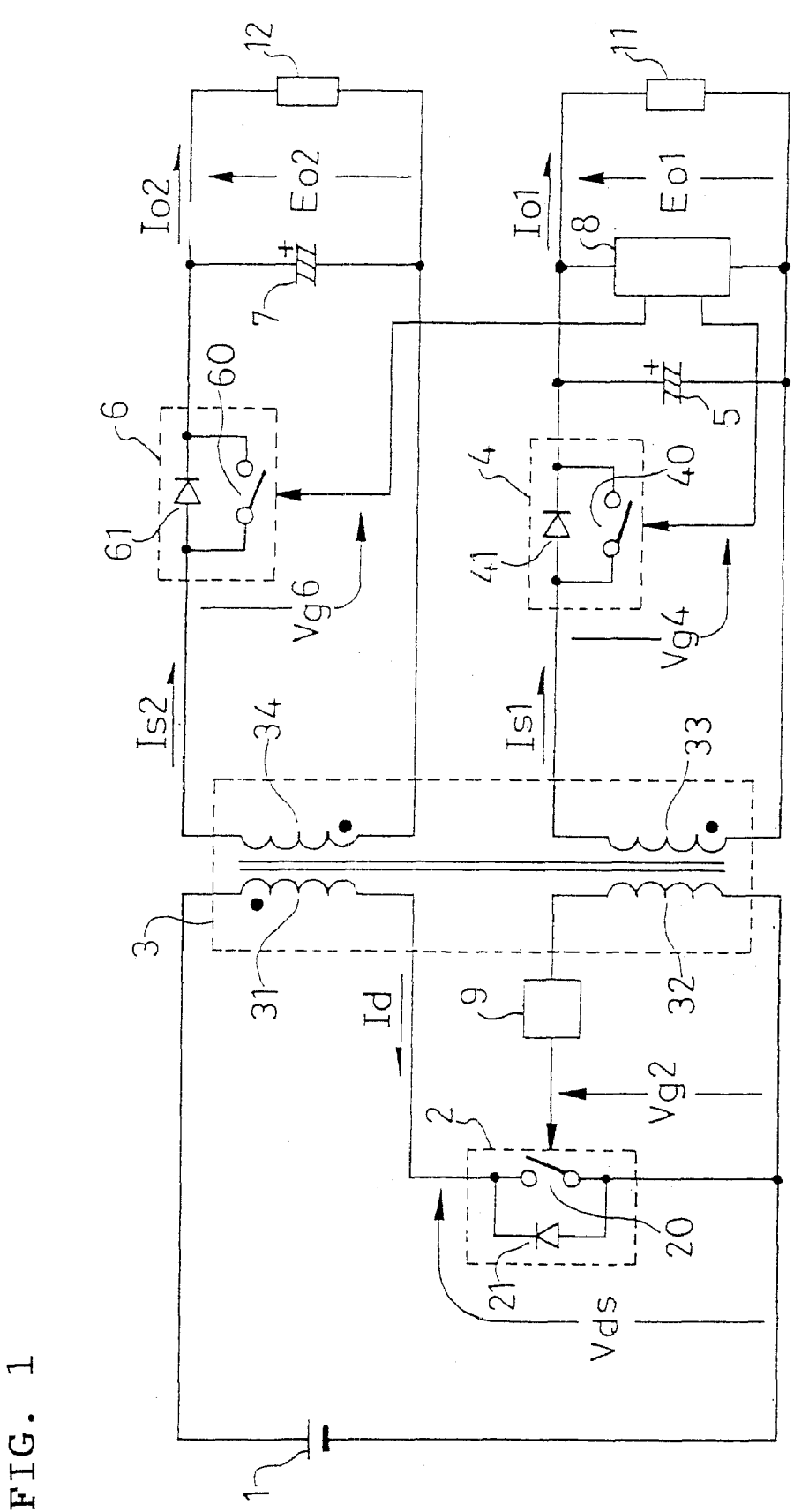
FIG. 1 is a circuit diagram of a multi-output switching power source apparatus in accordance with a first embodiment of the present invention.
Figure 2:
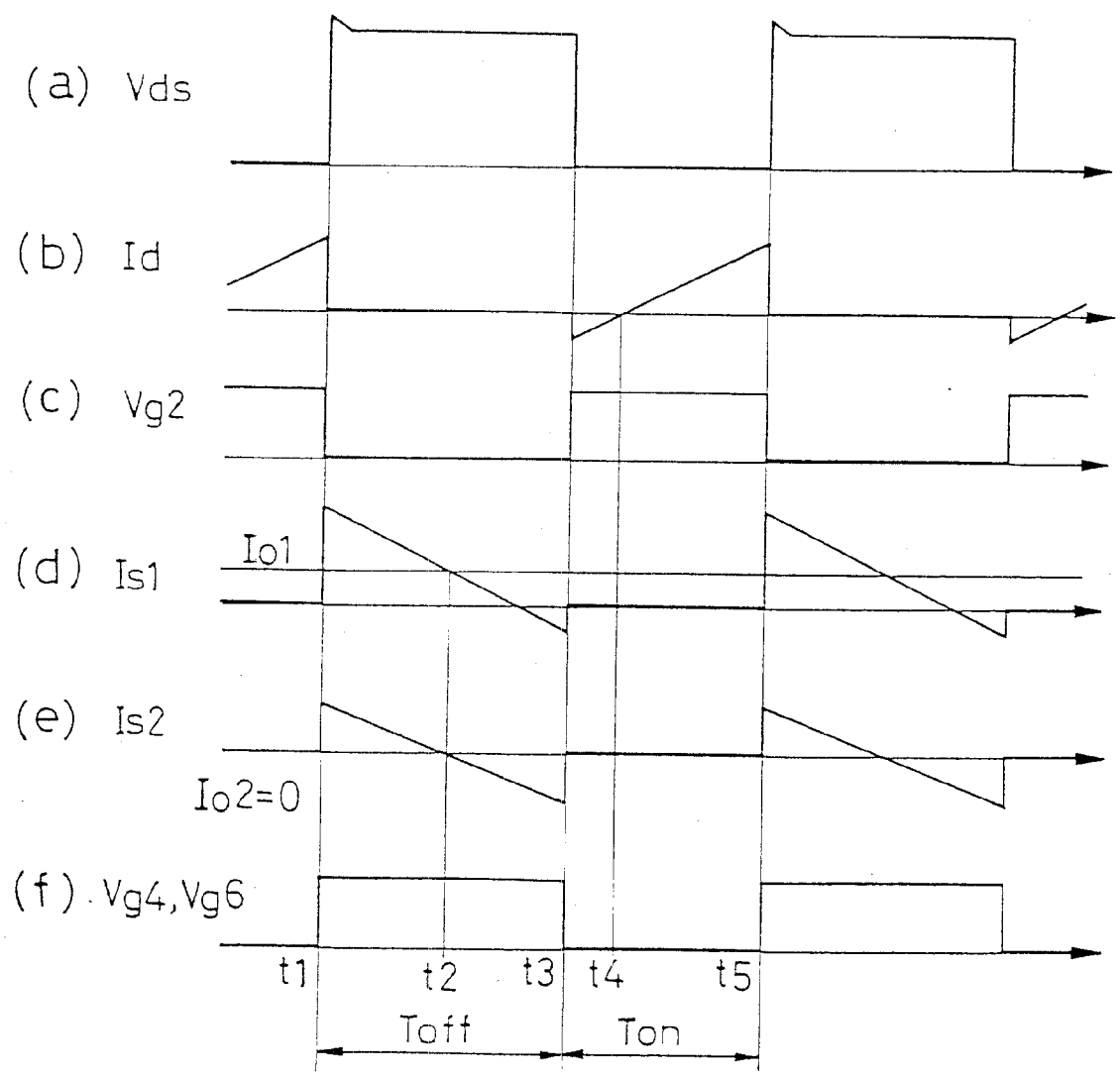
FIG. 2 is an operation waveform diagram at various portions of the multi-output switching power source apparatus in accordance with the first embodiment.

FIG. 1 is a circuit diagram showing the configuration of a multi-output switching power source apparatus in accordance with a first embodiment of the present invention. FIG. 2 is an operation waveform diagram at various portions of the multi-output switching power source apparatus in accordance with the first embodiment.

As shown in FIG. 1, the multi-output switching power source apparatus in accordance with the first embodiment is configured so that the voltage of a DC power source 1 is applied to a primary winding 31 on the primary side of a transformer 3 via a main switching circuit 2. The main switching circuit 2 comprises a parallel circuit of a main switching device 20 and a diode 21, and the main switching device 20 is ON/OFF controlled by a drive circuit 9 connected to the drive winding 32 of the transformer 3. A first secondary winding 33 and a second secondary winding 34 are provided on the secondary side of the transformer 3. A first secondary switching circuit 4 comprising a parallel circuit of a first secondary switching device 40 and a first rectifying diode 41 is connected to the first secondary winding 33. A second secondary switching circuit 6 comprising a parallel circuit of a second secondary switching device 60 and a second rectifying diode 61 is connected to the second secondary winding 34. The first secondary switching device 40 and the second secondary switching device 60 are ON/OFF controlled by a control circuit 8.

A first output capacitor 5 and the control circuit 8 are provided at the rear of the first secondary switching circuit 4, and both the end terminals of the first output capacitor 5 are connected to a first load 11. A second output capacitor 7 is provided at the rear of the second secondary switching circuit 6, and both the end terminals of the second output capacitor 7 are connected to a second load 12.

Next, the operation of the multi-output switching power source apparatus in accordance with the first embodiment of the present invention will be described by using FIG. 1 and FIG. 2.

In FIG. 1, the DC power source 1 outputs a DC voltage Ei. The voltage of the main switching circuit 2 comprising the main switching device 20 and the diode 21 is designated by Vds, and the current flowing through the circuit is designated by Id. The current flowing through the first secondary switching circuit 4 comprising the first secondary switching device 40 and the first rectifying diode 41 is designated by Is1. The first output capacitor 5 outputs a first output voltage Eo1 and a first output current Io1 to the first load 11. The current flowing through the second secondary switching circuit 6 comprising the second secondary switching device 60 and the second rectifying diode 61 is designated by Is2. The second output capacitor 7 outputs a second output voltage Eo2 and a second output current Io2 to the second load 12.

The control circuit 8 adjusts the ON/OFF periods of the first secondary switching device 40 and the second secondary switching device 60 so as to stabilize the first output voltage Eo1. The first secondary switching circuit 40 is ON/OFF controlled by a drive pulse signal Vg4 output by the control circuit 8. The second secondary switching circuit 60 is ON/OFF controlled by a drive pulse signal Vg6 output by the control circuit 8.

The drive circuit 9 detects the voltage of the drive winding 32 of the transformer 3 and outputs a drive pulse signal Vg2 for ON/OFF controlling the main switching device 20.

FIG. 2 is waveform diagrams showing the operations at various portions in the multi-output switching power source apparatus in accordance with the first embodiment. In FIG. 2, a part (a) shows the voltage Vds of the main switching circuit 2, a part (b) shows the current Id flowing through the main switching circuit 2, a part (c) shows the drive pulse signal Vg2 for ON/OFF controlling the main switching device 20, a part (d) shows the current Is1 flowing through the first secondary switching circuit 4, a part (e) shows the current Is2 flowing through the second secondary switching circuit 6, and a part (f) shows the drive pulse signal Vg4 for driving the first secondary switching device 40 and the drive pulse signal Vg6 for driving the second secondary switching device 60. The two drive pulse signals Vg4 and Vg6 are set so as to be the same drive pulse signal; however, even if there is some difference therebetween because of variations in components and the like, the basic operation is not affected.

First, when the main switching circuit 2 is ON, the input voltage Ei is applied to the primary winding 31 of the transformer 3. At this time, the current Id flows through the primary winding 31. When the main switching circuit 2 turns off at time t1, the current Is1 flows from the first secondary winding 33 to the first output capacitor 5 via the first rectifying diode 41. Furthermore, the current Is2 flows from the second secondary winding 34 to the second output capacitor 7 via the second rectifying diode 61. The first secondary switching device 40 is turned ON by the drive pulse signal Vg4 during the period between time t1 and time t2. Still further, the second secondary switching device 60 is turned on by the drive pulse signal Vg6 during the period between time t1 and time t2.

As shown in the parts (d) and (e) of FIG. 2, the current Is1 and the current Is2 decrease gradually and become zero soon. Then, the current Is1 and the current Is2 flow continuously in the opposite direction via the first secondary switching device 40 and via the second secondary switching device 60 respectively. Hence, the first output voltage Eo1 is applied to the first secondary, winding 33, and the output voltage Eo2 is applied to the second secondary winding 34. The control circuit 8 controls the ON periods of the first secondary switching device 40 and the second secondary switching device 60. When the first secondary switching device 40 and the second secondary switching device 60 turn OFF at time t3, the winding voltages of the transformer 3 are reversed. At this time, the diode 21 conducts on the primary side of the transformer 3. The drive circuit 9 detects that the voltage of the drive winding 32 has been reversed, and outputs the drive pulse signal Vg2 for turning on the main switching device 20. Hence, the current Id flowing through the main switching circuit 2 flows so as to regenerate electric power for the DC power source 1.

This current Id becomes zero at time t4. After time t4, the current flows from the DC power source 1 to the main switching device 20 via the primary winding 31. At time t5, the main switching device 20 turns OFF, and the above-mentioned operation after time t1 is repeated.

When the number of turns of the primary winding 31 is N31, when the number of turns of the Output winding 33 is N33, when the number of turns of the output winding 34 is N34, and when the ON period and the OFF period of the main switching circuit 2 are Ton and Toff respectively in the above-mentioned operation, the first output voltage Eo1 and the second output voltage Eo2 are represented by the following expressions (3) and (4) respectively:

$$Eo1 \approx (N33/N31) \cdot (Ton/Toff) \cdot Ei \quad (3), \text{ and}$$

$$Eo2 \approx (N34/N31) \cdot (Ton/Toff) \cdot Ei \quad (4).$$

In the multi-output switching power source apparatus in accordance with the first embodiment, the drive circuit 9 sets the ON period Ton, and the control circuit 8 adjusts the OFF period Toff so as to stabilize the first output voltage Eo1.

Next, specific examples of the control circuit 8 and the drive circuit 9 of the multi-output switching power source apparatus in accordance with the first embodiment operating as described above will be explained.

Figure 3:
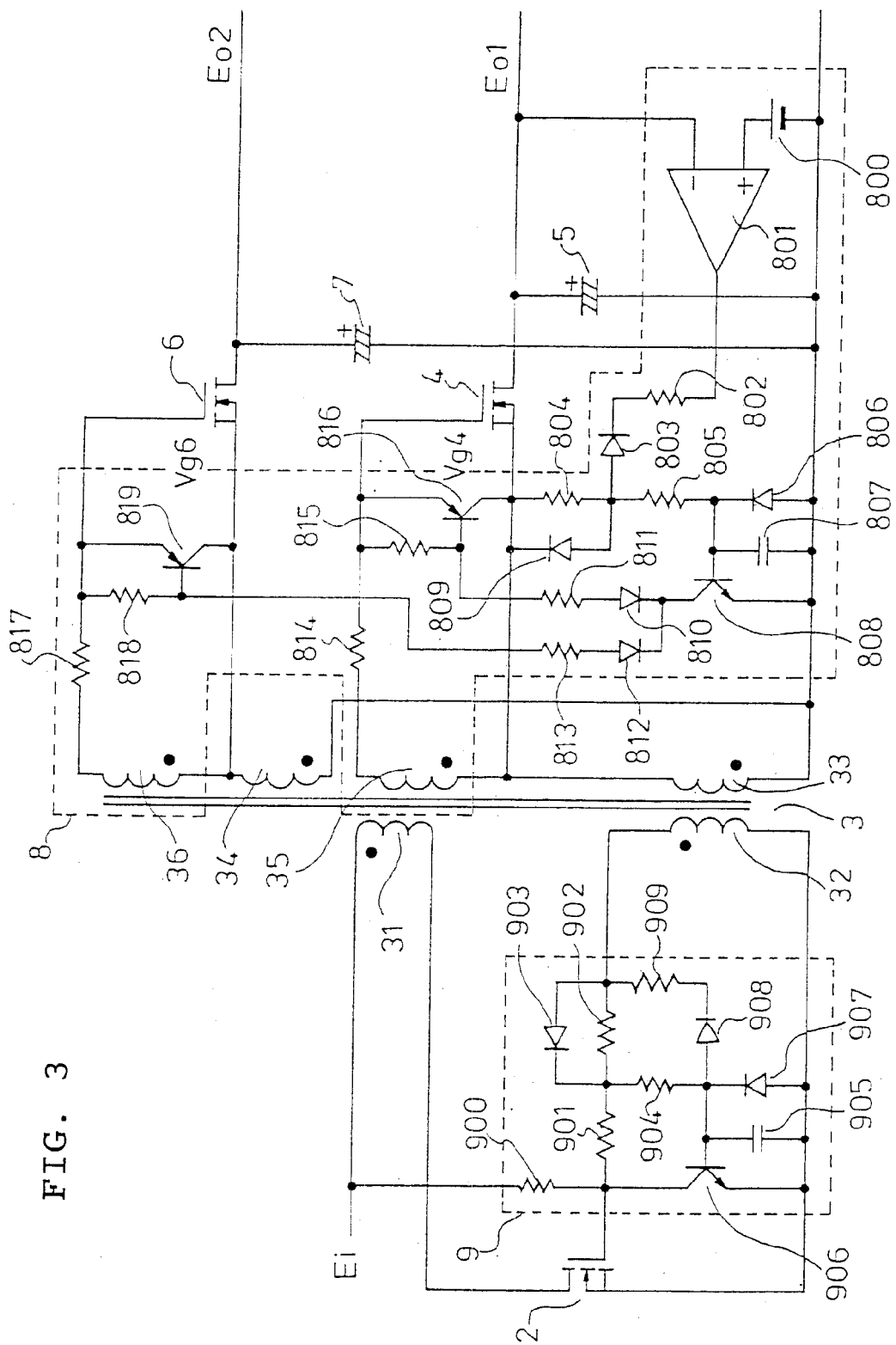
FIG. 3 is a specific circuit diagram of the multi-output switching power source apparatus in accordance with the first embodiment.

FIG. 3 is an example of a specific circuit diagram showing the control circuit 8 and the drive circuit 9 of the multi-output switching power source apparatus in accordance with the first embodiment. In the circuit shown in FIG. 3, FETs are used for the main switching circuit 2, the first secondary switching circuit 4 and the second secondary switching circuit 6. Since the FETs include body diodes therein, the diode 21, the first rectifying diode 41 and the second rectifying diode 61 shown in FIG. 1 can be omitted.

First, the operation of the specific control circuit 8 shown in FIG. 3 will be described.

A differential amplifier 801 compares the first output voltage Eo1 with a reference voltage 800. When the main switching circuit 2 is OFF, the voltage generating across a first secondary drive winding 35 provided for the transformer 3 raises the drive pulse signal Vg4 for driving the first secondary switching circuit 4 via a resistor 814. At the same time, the voltage generating across a second secondary drive winding 36 provided for the transformer 3 raises the drive pulse signal Vg6 for the second secondary switching circuit 6 via a resistor 817. Furthermore, the voltage generating across the first output winding 33 charges a capacitor 807 via resistors 804 and 805. This charging current is diverted to the output of the differential amplifier 801 by a diode 803 and a resistor 802. When the voltage of the capacitor 807 reaches about 0.7 V, a transistor 808 turns ON; hence, a transistor 816 turns ON since its base current flows via a diode 810 and a resistor 811, whereby the drive pulse signal Vg4 is lowered to turn OFF the first secondary switching circuit 4. At the same time, a transistor 819 turns ON since its base current flows via a diode 812 and a resistor 813, whereby the drive pulse signal Vg6 is lowered to turn OFF the second secondary switching circuit 6. When the first secondary switching circuit 4 and the second secondary switching circuit 6 are turned OFF, the winding voltages of the transistor 3 are reversed. At this time, the capacitor 807 is discharged to the forward voltage of a diode 806 via a diode 809 and the resistor 805. Furthermore, the transistor 816 and the transistor 819 turn OFF since the base currents are not supplied and the base-emitter voltages become lost via a resistor 815 and a resistor 818 respectively. The ON periods of the first secondary switching circuit 4 and the second secondary switching circuit 6 are set by the charging time of the capacitor 807. The charging current for determining this charging time is adjusted by the output of the differential amplifier 801. In other words, the ON periods of the first secondary switching circuit 4 and the second secondary switching circuit 6 are controlled so as to become long when the first output voltage Eo1 begins to become higher than a predetermined value, and on the other hand so as to become short when the voltage begins to become lower than the predetermined value.

Next, the operation of the specific drive circuit 9 shown in FIG. 3 will be described.

At the time of starting, the drive circuit 9 raises and outputs the drive pulse signal Vg2 from the DC power source 1 via a starting resistor 900. During normal operation, when the main switching circuit 2 is ON, a voltage generating across the drive winding 32 of the transformer 3 is output as the drive pulse signal Vg2 via resistors 901 and 902 and a diode 903 in the drive circuit 9. When the drive pulse signal Vg2 rises, a capacitor 905 is charged via a resistor 904. When the voltage of the capacitor 905 reaches about 0.7 V, a transistor 906 turns ON; when the drive pulse signal Vg2 lowers, the main switching circuit 2 turns OFF. When the main switching circuit 2 turns off, the voltage across the drive winding 32 is reversed. Hence, the capacitor 905 is discharged to the forward voltage of the diode 907 via a diode 908 and a resistor 900. The ON period of the main switching circuit 2 is set by the charging time of the capacitor 905.

Next, in the multi-output switching power source apparatus in accordance with the first embodiment, it will be explained that the output voltages Eo1 and Eo2 are prevented from fluctuating, in any conditions of the output currents Io1 and Io2 excluding overload conditions.

As shown in the parts (d) and (e) of FIG. 2, even when the first output current Io1 flows and the second output current Io2 is zero, the current Is2 flowing through the second secondary winding 34 flows during the whole range of the OFF period Toff. Hence, the second output voltage Eo2 does not rise. On the other hand, even when the first output current Io1 is zero and the second output current Io2 flows, the current Is1 flowing through the first secondary winding 33 flows during the whole range of the OFF period Toff. Hence, factors for raising the first output voltage Eo1 are not present, and the second output voltage Eo2 is prevented from lowering.

Since the first secondary switching circuit 4 and the second secondary switching circuit 6 are ON during the OFF period Toff, the outputs are short-circuited via the transformer 3. As a result, the multi-output switching power source apparatus in accordance with the first embodiment can flow current in two directions. Hence, in the multi-output switching power source apparatus configured as described above, factors for generating voltages different from the winding voltages obtained by conversion depending on the ratio of the number of turns of the windings of the transformer 3 are not present in any load conditions, and the fluctuations of the output voltages are limited to voltage drops due to the respective output line impedances.

Figure 4:
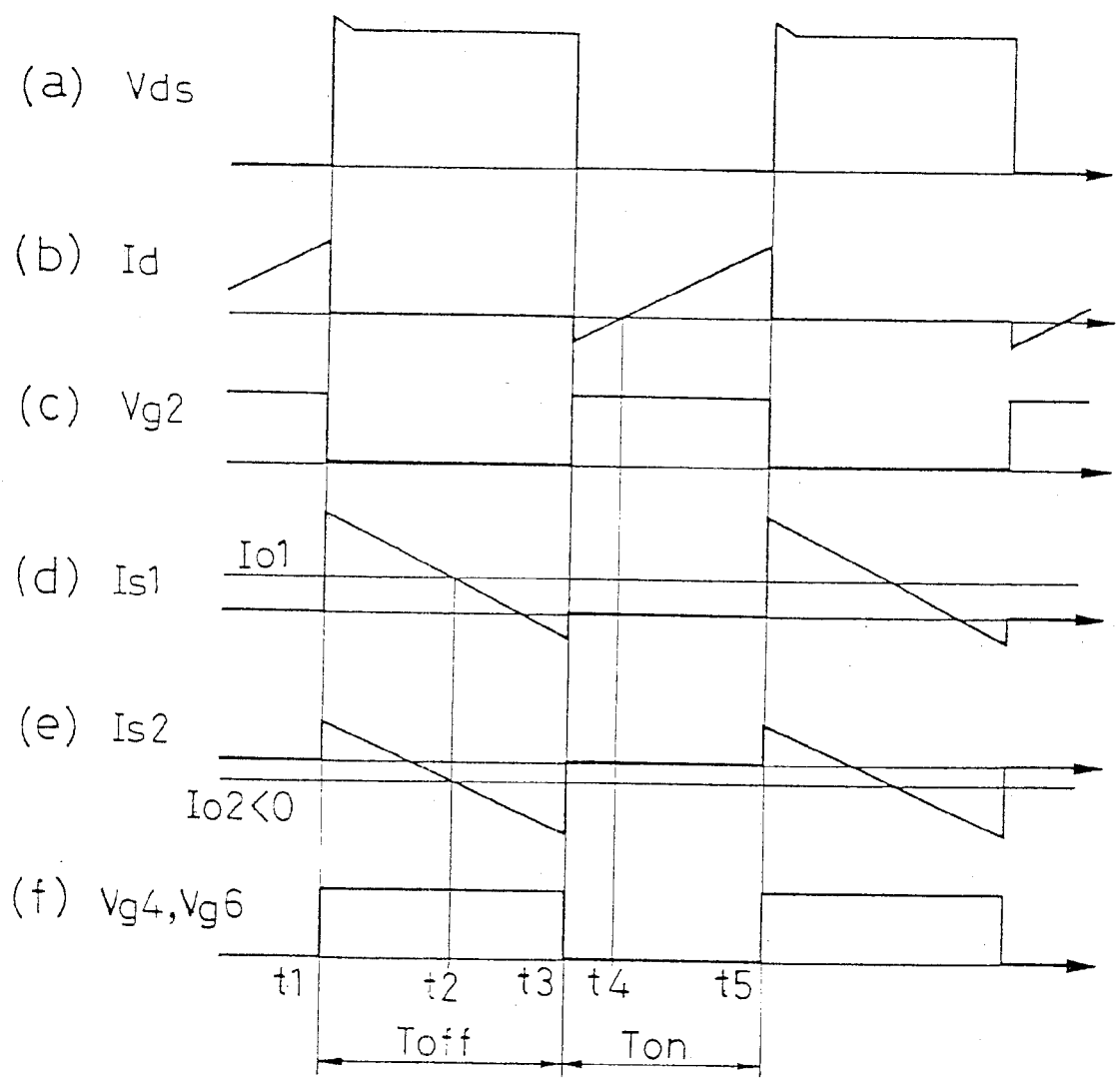
FIG. 4 is an operation waveform diagram at various portions of the multi-output switching power source apparatus in accordance with the first embodiment.

In the multi-output switching power source apparatus in accordance with the first embodiment, the fluctuation of the output voltage is controlled against an output current less than zero as a load condition, that is, an inflow current from a load side. FIG. 4 is operation waveform diagrams at various portions in the case when the second output current Io2 is negative. The operation waveform diagrams shown in FIG. 4 differ from the above-mentioned operation waveform diagrams of FIG. 2 only by an increase due to the amount of the backflow of the current Is2 flowing through the second secondary winding 34. The state shown in FIG. 4 is equivalent to a state wherein electric power is supplied from a load side to the second output.

As described above, in the multi-output switching power source apparatus in accordance with the first embodiment, factors for fluctuating each output voltage can be limited to a voltage drop due to the line impedance of each output by short-circuiting the outputs via the transformer 3 during the OFF period of the main switching circuit 2. Hence, the multi-output switching power source apparatus in accordance with the first embodiment can control the fluctuations of the output voltages in any load conditions including inflow from a load but excluding overloads.

<<Second Embodiment>>

Figure 5:
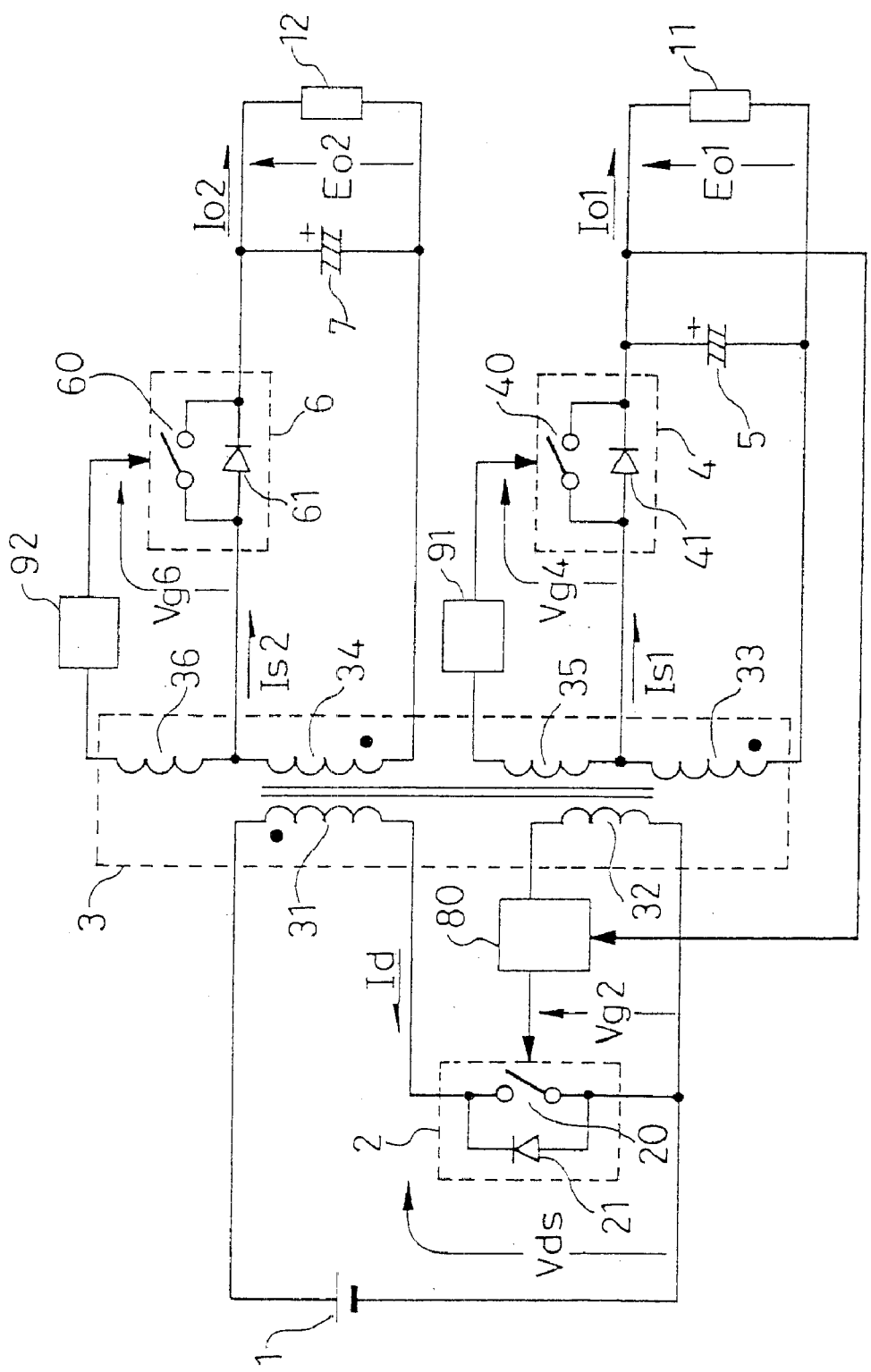
FIG. 5 is a circuit diagram of a multi-output switching power source apparatus in accordance with a second embodiment of the present invention.

FIG. 5 is a circuit diagram showing the configuration of a multi-output switching power source apparatus in accordance with a second embodiment of the present invention. The multi-output switching power source apparatus in accordance with the second embodiment differs from that in accordance with the above-mentioned first embodiment shown in FIG. 1 in the configurations of a control circuit 80 for ON/OFF driving the main switching device 20, a first drive circuit 91 for ON/OFF driving the first secondary switching device 40 and a second drive circuit 92 for ON/OFF driving the second secondary switching device 60. The components of the second embodiment having the same functions and configurations as those of the first embodiment are designated by the same numerals, and their explanations are omitted.

The control circuit 80 detects the voltage of the drive winding 32, raises the drive pulse signal Vg2 for driving the main switching device 20 and adjusts the pulse width of the drive pulse signal Vg2 so as to stabilize the first output voltage Eo1. The first drive circuit 91 detects the voltage of the first secondary drive winding 35 and outputs the drive pulse signal Vg4 for turning ON the first secondary switching device 40 only during a predetermined time. The second drive circuit 92 detects the voltage of the second secondary drive winding 36 and outputs the drive pulse signal Vg6 for turning ON the second secondary switching device 60 only during a predetermined time. In these operations, the first drive circuit 91 and the second drive circuit 92 are set so that the first secondary switching device 40 and the second secondary switching device 60 turn on at the same timing and so that their ON periods are equal. However, even if there is some difference between these timings because of variations in components and the like, the basic operation is not affected significantly.

The operation of the multi-output switching power source apparatus in accordance with second embodiment is substantially the same as the operation of the above-mentioned first embodiment. In the first embodiment, the first output voltage Eo1 is stabilized by adjusting the ON periods of the first secondary switching circuit 4 and the second secondary switching circuit 6. In the second embodiment, the first output voltage Eo1 is stabilized by adjusting the ON period of the main switching circuit 2.

Figure 6:
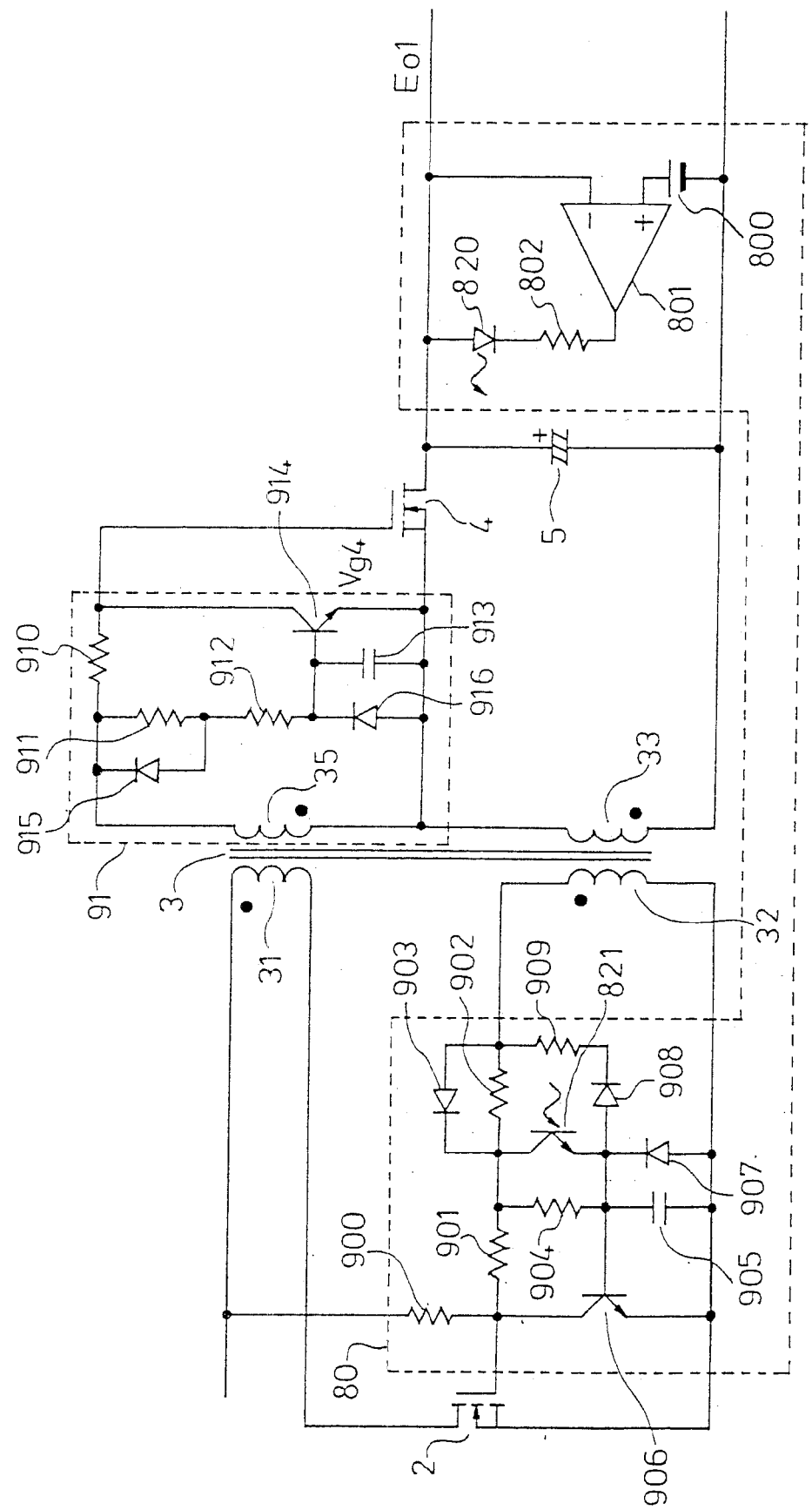
FIG. 6 is a specific circuit diagram of the multi-output switching power source apparatus in accordance with the second embodiment.

FIG. 6 is a specific circuit diagram showing the control circuit 80 and the first drive circuit 91 in accordance width the second embodiment. Since the configuration of the second drive circuit 92 is the same as that of the first drive circuit 91, its explanation is omitted. In the second embodiment, FETs are used for the main switching circuit 2, the first secondary switching circuit 4 and the second secondary switching circuit 6.

First, the operation of the control circuit 80 shown in FIG. 6 will be described.

The differential amplifier 801 compares the first output voltage Eo1 with the reference voltage 800. The output of the differential amplifier 801 is fed back to the primary side of the transformer 3 as a current flowing through a phototransistor 821 via a photodiode 820.

On the primary side, at the time of starting, the drive pulse signal Vg2 is raised from the DC power source 1 via the starting resistor 900. During ordinary operation, when the main switching circuit 2 is ON, the voltage generating across the drive winding 32 raises the drive pulse signal Vg2 via the resistors 901 and 902 and the diode 903. When the drive pulse signal Vg2 rises in this way, the capacitor 905 is charged via the resistor 904 and the phototransistor 821.

When the voltage of the capacitor 905 reaches about 0.7 V, the transistor 906 turns ON, and the main switching circuit 2 turns OFF. When the main switching circuit 2 turns OFF, the voltage across the drive winding 32 is reversed, and the capacitor 905 is discharged to the forward voltage of the diode 907 via the diode 908 and the resistor 900. Hence, the ON period of the main switching circuit 2 is set by the charging time of the capacitor 905. The charging current for determining the charging time is adjusted by the current flowing through the phototransistor 821. Thus, the ON period of the main switching circuit 2 is controlled so as to become short when the first output voltage Eo1 begins to become higher than a predetermined value, and on the other hand so as to become long reversely when the voltage begins to become lower than the predetermined value. As a result, the output voltage Eo1 stabilizes.

Next, the operation of the first drive circuit 91 shown in FIG. 6 will be described.

When the main switching circuit 2 is OFF, the flyback voltage generating across the first secondary drive winding 35 raises the drive pulse signal Vg4 for driving the first secondary switching circuit 4 via the resistor 910. When the drive pulse signal Vg4 rises, a capacitor 913 is charged via resistors 911 and 912. When the voltage of the capacitor 913 reaches about 0.7 V, a transistor 914 turns ON, and the first secondary switching device 4 turns OFF. When the first secondary switching device 4 turns OFF, the voltage across each winding of the transformer 3 is reversed, and the capacitor 913 is discharged to the forward voltage of a diode 916 via a diode 915 and the resistor 912. Hence, the ON period of the first secondary switching device 4 is set by the charging time of the capacitor 913.

The above-mentioned operations of the first drive circuit 91 and the first secondary switching device 4 are the same as the operations of the second drive circuit 92 and the second secondary switching device 6.

As described above, in the multi-output switching power source apparatus in accordance with the second embodiment, the output voltages are short-circuited via the transformer 3 during the OFF period of the main switching circuit 2 just as in the case of the above-mentioned first embodiment. Therefore, in the multi-output switching power source apparatus in accordance with the second embodiment, factors for fluctuating each output voltage can be limited to a voltage drop due to the line impedance of each output. Hence, the multi-output switching power source apparatus in accordance with the second embodiment can control the fluctuations of the output voltages in any load conditions including inflow from a load but excluding overloads.

Furthermore, the ON period of the main switching circuit 2 is adjusted to stabilize the outputs in the second embodiment, although the ON periods of the plurality of secondary switching devices are adjusted to stabilize the outputs in the above-mentioned first embodiment. As described above, in the multi-output switching power source apparatus in accordance with the first embodiment, control is carried out on the secondary side of the transformer 3. Therefore, the configuration of the first embodiment has an advantage of not requiring any insulating means, such as a photocoupler, in comparison with the second embodiment. However, when the number of output voltages increases or when output voltages must be insulated from one another in the configuration of the first embodiment, its control and drive circuits become large in size and complicated, thereby causing a problem. In the case of the configuration of the second embodiment, however, control can be carried out on the primary side of the transformer 3, whereby its control and drive circuits can be simplified.

<<Third Embodiment>>

Figure 7:
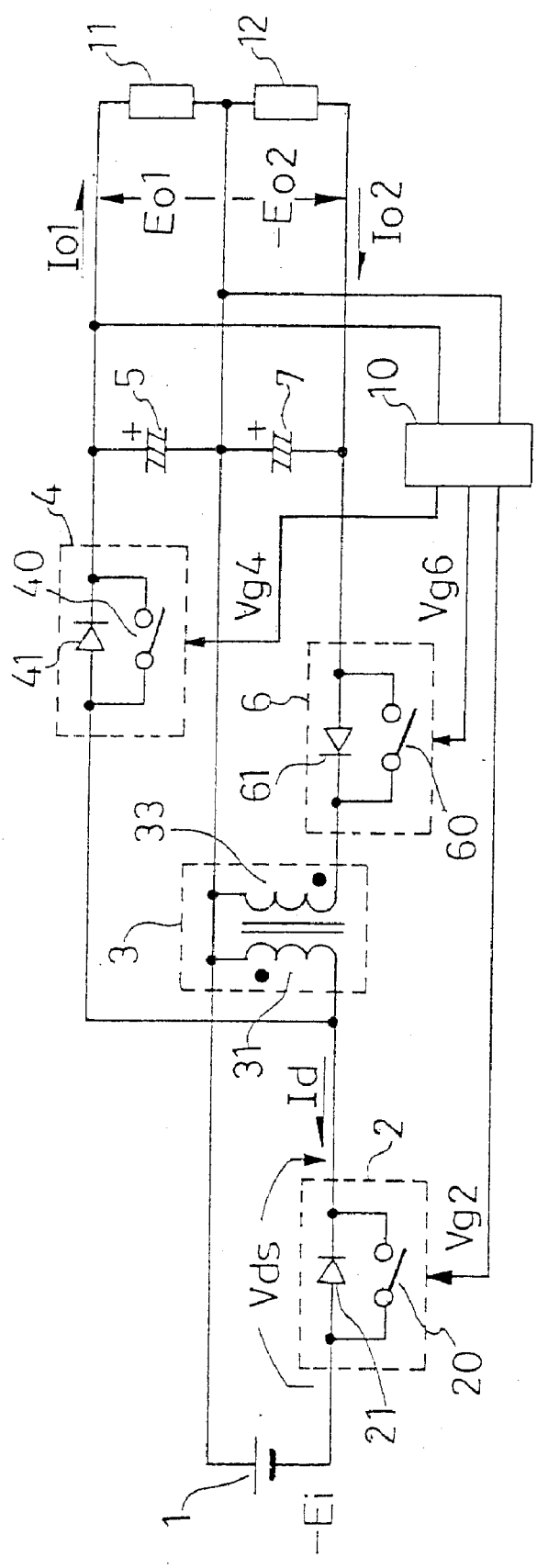
FIG. 7 is a circuit diagram of a multi-output switching power source apparatus in accordance with a third embodiment of the present invention.

FIG. 7 is a circuit diagram showing the configuration of a multi-output switching power source apparatus in accordance with a third embodiment of the present invention. As shown in FIG. 7, the multi-output switching power source apparatus in accordance with the third embodiment is provided with a control drive circuit 10 for ON/OFF driving the main switching device 20, the first secondary switching device 40 and the second secondary switching device 60. Furthermore, in the multi-output switching power source apparatus in accordance with the third embodiment, the input and the output, i.e., the primary side and the secondary side, of the transformer 3 are uninsulated from each other and share a zero potential. The components of the third embodiment having the same functions and configurations as those of the above-mentioned embodiments are designated by the same numerals, and their explanations are omitted.

In the multi-output switching power source apparatus in accordance with the third embodiment, the DC power source 1 outputs voltage −Ei. The first output capacitor 5 outputs the first output voltage Eo1 and the first output current Io1 to the first load 11. The second output capacitor 7 outputs the second output voltage −Eo2 and the second output current Io2 to the second load 12. The control drive circuit 10 turns ON the first secondary switching device 40 and the second secondary switching device 60 after the main switching device 20 is turned OFF, and turns ON the main switching device 20 after the first secondary switching device 40 and the second secondary switching device 60 are turned OFF.

The control drive circuit 10 adjusts the ON/OFF periods of the main switching device 20, the first secondary switching device 40 and the second secondary switching device 60 so as to stabilize the first output voltage Eo1, and outputs the drive pulse signals Vg2, Vg4 and Vg6. In these operations, the drive pulse signals Vg4 and Vg6 are set so as to become the same drive pulse signal. However, even if there is some difference between these timings because of variations in components and the like, the basic operation is not affected significantly.

The control drive circuit 10 may be configured so that the main switching device 20 is driven during a predetermined ON period and so that the first secondary switching device 40 and the second secondary switching device 60 are driven during ON periods adjusted so as to stabilize the first output voltage Eo1, just as in the case of the first embodiment. Furthermore, the control drive circuit 10 may be configured so that the first secondary switching device 40 and the second secondary switching device 60 are driven during predetermined ON periods and so that the main switching device 20 is driven during ON periods adjusted so as to stabilize the first output voltage Eo1, just as in the case of the second embodiment.

In the multi-output switching power source apparatus in accordance with the third embodiment shown in FIG. 7, when the main switching circuit 2 is ON, the voltage Ei is applied across the primary winding 31, and the current Id flows. When the main switching circuit 2 turns OFF, currents flow from the primary winding 31 and the output winding 33 via the first rectifying diode 41 and the second rectifying diode 61 respectively. These currents decrease and become zero soon; however, the currents flow continuously in the opposite directions via the first secondary switching device 40 and the second secondary switching device 60. In other words, the first output voltage Eo1 is applied to the primary winding 31 of the transformer 3, and the second output voltage Eo2 is applied to the output winding 33. When the first secondary switching device 40 and the second secondary switching device 60 turn OFF, the winding voltages of the transformer 3 are reversed, and the diode 21 conducts on the primary side of the transformer 3. At this time, the control drive circuit 10 turns ON the main switching device 20, and the current Id flowing through the main switching circuit 2 flows so as to regenerate electric power for the DC power source 1. This regenerative current Id becomes zero soon but flows continuously in the opposite direction from the DC power source 1 through the primary winding 31 and the main switching device 20, and the above-mentioned operation is repeated.

When the number of turns of the primary winding 31 of the transformer 3 is N31, when the number of turns of the output winding 33 is N33, and when the ON period and the OFF period of the main switching circuit 2 are Ton and Toff in the above-mentioned operation, the output voltage Eo1 and the output voltage Eo2 are represented by the following expressions (5) and (6) respectively:

$$Eo1 \approx (Ton/Toff) \cdot Ei \qquad (5), \text{ and}$$

$$Eo2 \approx (N33/N31) \cdot (Ton/Toff) \cdot Ei \qquad (6).$$

In the multi-output switching power source apparatus in accordance with the third embodiment, the output voltages are short-circuited via the transformer 3 during the OFF period of the main switching circuit 2, just as in the case of the above-mentioned embodiments. Hence, even in the multi-output switching power source apparatus in accordance with the third embodiment, factors for fluctuating each output voltage can also be limited to a voltage drop due to the line impedance of each output. The multi-output switching power source apparatus in accordance with the third embodiment can control the fluctuations of the output voltages in any load conditions including inflow from a load but excluding overloads.

Furthermore, the primary winding 31 of the transformer 3 is used as one output winding when the input and output voltages are uninsulated from each other just as in the case of the third embodiment. When the main switching circuit 2 is OFF, the voltage at that time is the sum of the input DC voltage Ei and the output voltage Eo1, and no surge voltage occurs. Hence, the configuration of the multi-output switching power source apparatus in accordance with the third embodiment can reduce switching losses and switching noise.

<<Fourth Embodiment>>

Figure 8:
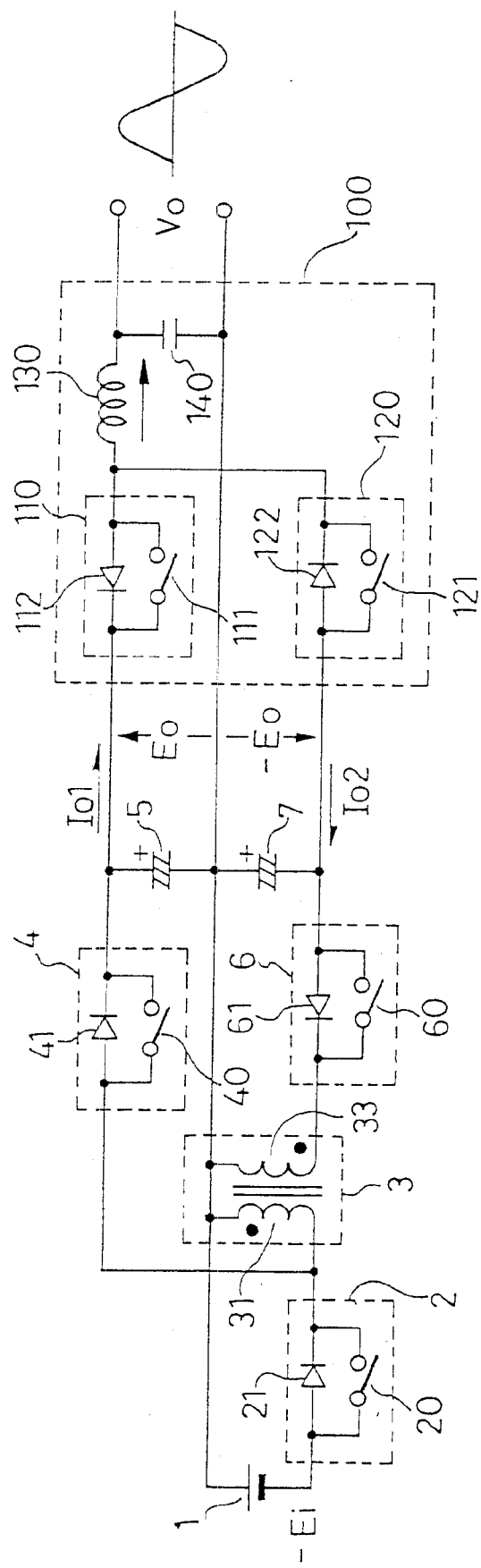
FIG. 8 is a circuit diagram of a multi-output switching power source apparatus in accordance with a fourth embodiment of the present invention.

FIG. 8 is a circuit diagram showing the configuration of a multi-output switching power source apparatus in accordance with a fourth embodiment of the present invention. As shown in FIG. 8, the multi-output switching power source apparatus in accordance with the fourth embodiment differs from the above-mentioned third embodiment in that the number of turns of the primary winding 31 of the transformer 3 is equal to the number of turns of the output winding 33 and that the first output voltage and the second output voltage are set at positive and negative voltages ±Eo have nearly equal absolute values. Furthermore, in the multi-output switching power source apparatus in accordance with the fourth embodiment, an inverter circuit 100 is connected as a load. The fourth embodiment is characterized by the operation of the inverter circuit 100 serving as a load. The components of the fourth embodiment having the same functions and configurations as those of the above-mentioned embodiments are designated by the same numerals, and their explanations are omitted.

As shown in FIG. 8, the inverter circuit 100 comprises a high-side switch 110, a low-side switch 120, a choke coil 130 and a smoothing capacitor 140. The high-side switch 110 and the low-side switch 120 are controlled so as to turn on and off alternately. The high-side switch 110 comprises a parallel circuit of a high-side switch 111 and a diode 112, and the low-side switch 120 comprises a parallel circuit of a low-side switch 121 and a diode 122. The inverter 100 has a function of converting an output voltage from a low-pass filter comprising the choke coil 130 and the smoothing capacitor 140 into a predetermined AC voltage by adjusting the ON/OFF periods of the high-side switch 110 and the low-side switch 120.

When the output voltage of the inverter circuit 100 generates on the plus side to charge the smoothing capacitor 140, the direction of the current flowing through the choke coil 130 is indicated by arrow X in FIG. 8. When the high-side switch 110 is ON, current flows through a path starting from the first output capacitor 5 to the high-side switch 110, the choke coil 130 and the smoothing capacitor 140 and then returning to the first output capacitor 5, whereby the first output capacitor 5 is discharged. Since the voltage of the first output capacitor 5, that is, the output voltage Eo1, is controlled so as to be stabilized, electric power is supplied from the switching power source section of the multi-output switching power source apparatus.

On the other hand, when the low-side switch 120 is ON, current flows through a path starting from the second output capacitor 7 to the low-side switch 120, the choke coil 130 and the smoothing capacitor 140 and then returning to the second output capacitor 7, whereby the second output capacitor 7 is charged.

Figure 9:
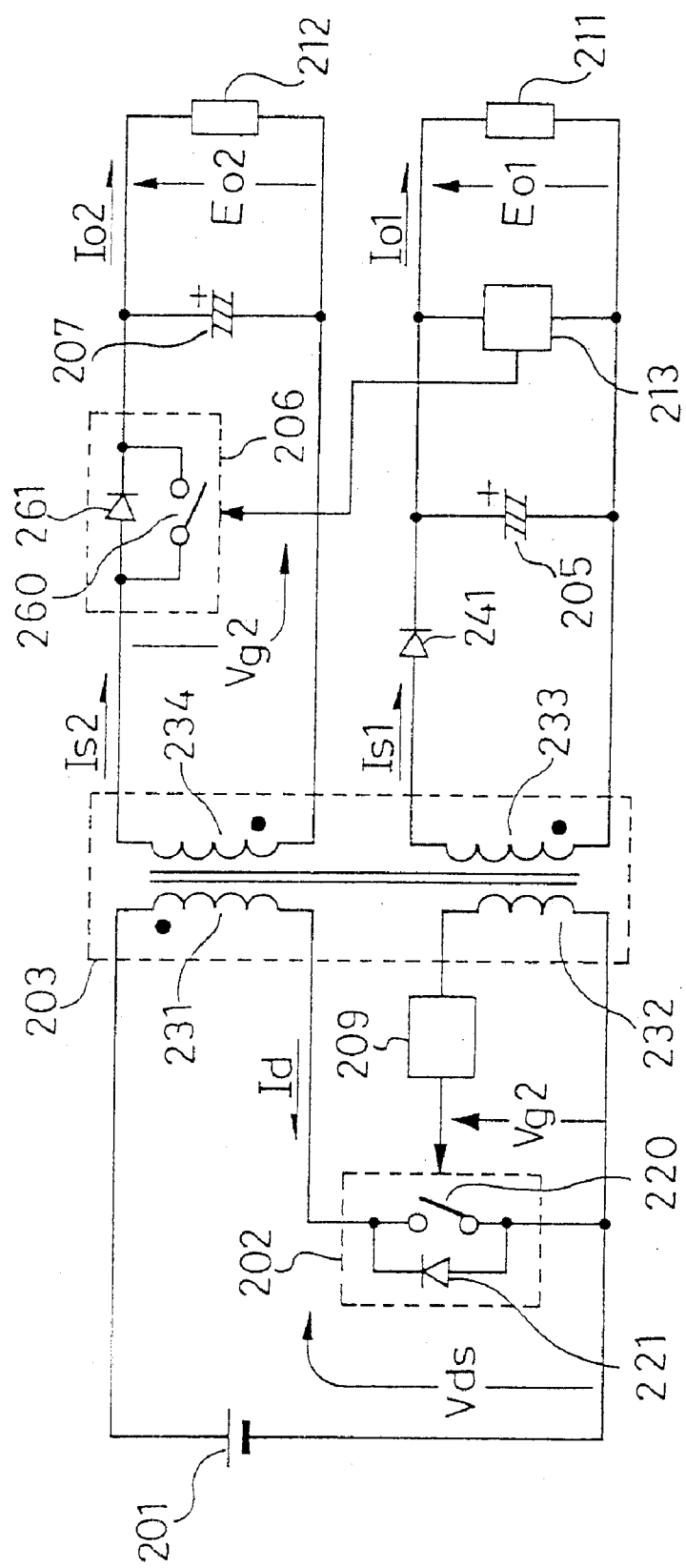
FIG. 9 is a circuit diagram of the conventional multi-output switching power source apparatus.
Figure 10:
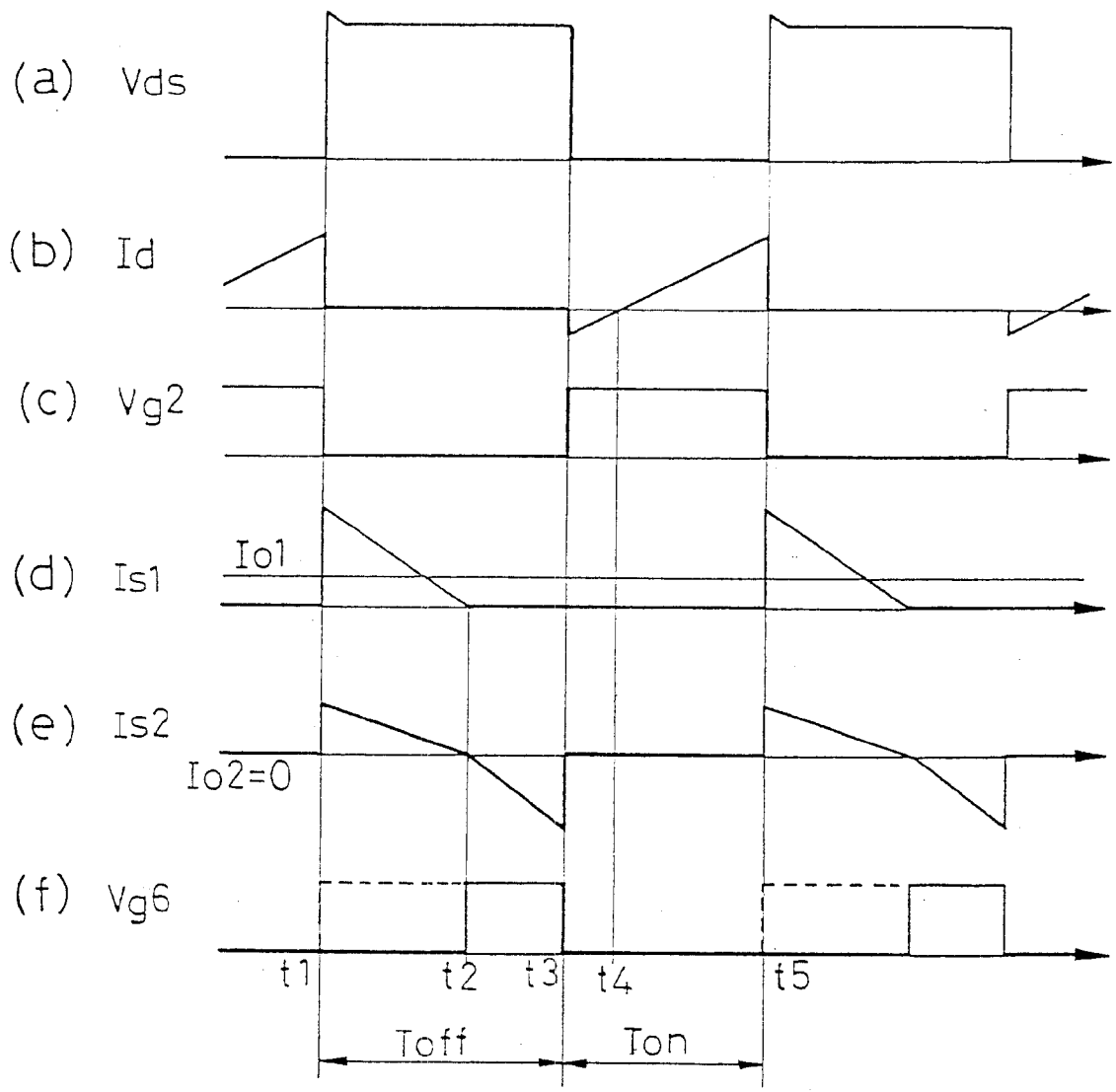
FIG. 10 is an operation waveform diagram at various portions of the conventional multi-output switching power source apparatus.

In the conventional switching power source apparatus shown in FIG. 9, when a second output capacitor 7 is charged, the voltage of the second output capacitor 7 rises and may exceed the withstand voltage of the capacitor; this may result in deterioration or breakage in some cases. Alternatively, when the second output capacitor 7 of the conventional switching power source apparatus is charged, overvoltage protection is activated, and the operation of the switching power source apparatus may be stopped. To prevent this, the electrostatic capacitance of the second output capacitor 7 must be made larger.

However, in the case of the configuration of the multi-output switching power source apparatus in accordance with the fourth embodiment, electric power can be supplied from the second output capacitor 7 to the first output capacitor 5 via the transformer 3. Hence, even when electric power is supplied from the load side and the second output capacitor 7 is charged, the voltage of the second output capacitor 7 does not rise. In other words, in the case of the fourth embodiment, it is not necessary to increase the electrostatic capacitance of the second output capacitor 7.

When the output voltage of the inverter circuit 100 generates on the minus side to discharge the smoothing capacitor 140, the direction of the current flowing through the choke coil 130 is opposite to the direction of the arrow X in FIG. 8. At this time, by the current flowing through the choke coil 130, the second output capacitor 7 is discharged and the first output capacitor 5 is charged. However, in the case of the multi-output switching power source apparatus in accordance with the fourth embodiment, electric power can be supplied from the first output capacitor 5 to the second output capacitor 7 via the transformer 3. Hence, even when electric power is supplied from the load side, the voltage of the first output capacitor 5 does not rise. In other words, in the case of the fourth embodiment, it is not necessary to increase the electrostatic capacitance of the first output capacitor 5.

As described above, it is recognized that the fourth embodiment, serving as an application example of the multi-output switching power source apparatus in accordance with the present invention, is suited for a power source for an inverter circuit to which positive and negative power source voltages are input and from which a predetermined AC voltage is output. This kind of inverter circuit 2 has a mode of electric power regeneration for the power source side; however, in the fourth embodiment, electric power transfer is possible between the output capacitors via the transformer 3. Hence, the multi-output switching power source apparatus in accordance with the fourth embodiment has an excellent effect of not causing any voltage increase even when electric power is supplied from the load side.

In the first embodiment to the fourth embodiment described above, multi-output switching power source apparatuses having two outputs have been explained; however, the multi-output switching power source apparatus in accordance with the present invention is not limited to this kind of configuration, but may be configured so as to have more outputs. In this case, the apparatus should only be configured so that a rectifying circuit connected to each output winding is used as a switching circuit, and that the switching circuit turns ON when the main switching circuit is OFF. However, not all the rectifying circuits connected to the output windings are required to be used as switching circuits. In other words, such a switching circuit should only be provided for an output requiring a regulation characteristic or an output to which current flows backward from a load side.

As described above, in the multi-output switching power source apparatus in accordance with the present invention, the outputs are short-circuited via the transformer during the OFF period of the main switching circuit, whereby factors for fluctuating each output voltage can be limited to a voltage drop due to the line impedance of each output.

Hence, the switching power source apparatus can control the fluctuations of the output voltages in any load conditions including electric power supply from a load but excluding overloads.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A multi-output switching power source apparatus comprising:
   a DC power source;
   a transformer having a primary winding and a plurality of output windings;
   a main switching circuit for converting the voltage of said DC power source into an AC voltage by repeating ON/OFF operation and for inputting the voltage to said primary winding of said transformer;
   first to nth (n: a natural number of 2 or more) secondary switching circuits connected to the first to nth output windings of said plurality of output windings respectively and turning ON/OFF complementarily with said main switching circuit in order to rectify AC voltages induced across said first to nth output windings;
   first to nth smoothing circuits for smoothing voltages rectified by said first to nth secondary switching circuits and for supplying first to nth DC output voltages to first to nth loads; and
   a control drive circuit for turning ON said first to nth secondary switching circuits after said main switching circuit is turned OFF, for turning ON said main switching circuit after said first to nth secondary switching circuits are turned OFF, for detecting one of said first to nth DC output voltages, and for adjusting the ON period of said main switching circuit and the ON periods of said first to nth secondary switching circuits to stabilize the DC output voltage.

2. A multi-output switching power source apparatus in accordance with claim 1, wherein at least one of said plurality of loads to which said first to nth DC output voltages are supplied has a load condition in which electric power flows from the load to said multi-output switching power source apparatus, and the electric power flowing from the load is output as electric power supplied to other loads to which the DC output voltages are supplied from said multi-output switching power source apparatus.

3. A multi-output switching power source apparatus in accordance with claim 1, wherein said control drive circuit comprises:
   a control circuit for turning ON said first to nth secondary switching circuits after said main switching circuit is turned OFF, for detecting one of said first to nth DC output voltages, and for adjusting the ON periods of said first to nth secondary switching circuits to stabilize the DC output voltage; and
   a drive circuit for turning ON said main switching circuit after said first to nth secondary switching circuits are turned OFF and for turned OFF said main switching circuit after a predetermined time.

4. A multi-output switching power source apparatus in accordance with claim 1, wherein said control drive circuit comprises:
   a control circuit for turning ON said main switching circuit after said first to nth secondary switching circuits are turned OFF, for detecting one of said first to nth DC output voltages, and for adjusting the ON period of said main switching circuit to stabilize the DC output voltage; and
   first to nth drive circuits for turning ON said first to nth secondary switching circuits after said main switching circuit is turned OFF and for turned OFF said main switching circuit after a predetermined time.

5. A multi-output switching power source apparatus in accordance with claim 1, wherein an inverter circuit comprising a series circuit having a high-side switch and a low-side switch connected between positive/negative voltage sources outputting positive/negative voltages, at least two of a plurality of DC output voltages having a common zero potential, and a series circuit having a choke coil and a smoothing capacitor, to which the voltages of said positive/negative voltage sources are applied by the ON/OFF operations of said high-side and low-side switches, is connected as a load, and said inverter circuit has a function of adjusting the ON/OFF periods of said high-side and low-side switches so as to output a predetermined AC voltage from said smoothing capacitor.

6. A multi-output switching power source apparatus comprising:
   a DC power source;
   a transformer having a primary winding and at least one output winding;
   a main switching circuit for converting the voltage of said DC power source into an AC voltage by repeating ON/OFF operation and for inputting the voltage to said primary winding of said transformer;
   a first secondary switching circuit connected to said primary winding and turning ON/OFF complementarily with said main switching circuit in order to rectify an AC voltage induced across said primary winding;
   second to (n+1)th (n: a natural number) secondary switching circuits connected to said first to nth output windings of said output windings and turning ON/OFF complementarily with said main switching circuit in order to rectify AC voltages induced across said first to nth output windings;
   first to (n+1)th smoothing circuits for smoothing voltages rectified by said first to (n+1)th secondary switching circuits and for supplying first to (n+1)th DC output voltages to first to (n+1)th loads; and
   a control drive circuit for turning ON said first to (n+1)th secondary switching circuits after said main switching circuit is turned OFF, for turning ON said main switching circuit after said first to (n+1)th secondary switching circuits are turned OFF, for detecting one of said first to (n+1)th DC output voltages, and for adjusting the ON period of said main switching circuit and the ON periods of said first to (n+1)th secondary switching circuits to stabilize the DC output voltage.

7. A multi-output switching power source apparatus in accordance with claim 6, wherein at least one of said plurality of loads to which said first to nth DC output voltages are supplied has a load condition in which electric power flows from the load to said multi-output switching power source apparatus, and the electric power flowing from the load is output as electric power supplied to other loads to which the DC output voltages are supplied from said multi-output switching power source apparatus.

8. A multi-output switching power source apparatus in accordance with claim 6, wherein said control drive circuit comprises:
   a control circuit for turning ON said first to (n+1)th secondary switching circuits after said main switching circuit is turned OFF, for detecting one of said first to (n+1)th DC output voltages, and for adjusting the ON periods of said first to (n+1)th secondary switching circuits to stabilize the DC output voltage; and
   a drive circuit for turning ON said main switching circuit after said first to (n+1)th secondary switching circuits are turned OFF and for turned OFF said main switching circuit after a predetermined time.

9. A multi-output switching power source apparatus in accordance with claim 6, wherein said control drive circuit comprises:
- a control circuit for turning ON said main switching circuit after said first to (n+1)th secondary switching circuits are turned OFF, for detecting one of said first to (n+1)th DC output voltages, and for adjusting the ON period of said main switching circuit to stabilize the DC output voltage; and
- first to (n+1)th drive circuits for turning ON said first to (n+1)th secondary switching circuits after said main switching circuit is turned OFF and for turned OFF said main switching circuit after a predetermined time.

10. A multi-output switching power source apparatus in accordance with claim 6, wherein an inverter circuit comprising a series circuit having a high-side switch and a low-side switch connected between positive/negative voltage sources outputting positive/negative voltages, at least two of a plurality of DC output voltages having a common zero potential, and a series circuit having a choke coil and a smoothing capacitor, to which the voltages of said positive/negative voltage sources are applied by the ON/OFF operations of said high-side and low-side switches, is connected as a load, and said inverter circuit has a function of adjusting the ON/OFF periods of said high-side and low-side switches so as to output a predetermined AC voltage from said smoothing capacitor.

* * * * *